US007445400B2

(12) United States Patent
Takeuchi

(10) Patent No.: US 7,445,400 B2
(45) Date of Patent: Nov. 4, 2008

(54) FRAME JOINT STRUCTURE AND JOINING METHOD THEREOF

(75) Inventor: Toshihiro Takeuchi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 564 days.

(21) Appl. No.: 10/653,823

(22) Filed: Sep. 3, 2003

(65) Prior Publication Data

US 2004/0045250 A1 Mar. 11, 2004

(30) Foreign Application Priority Data

Sep. 5, 2002 (JP) ............................ 2002-259899

(51) Int. Cl.
*F16B 7/00* (2006.01)
*F16B 12/36* (2006.01)
*F16B 13/00* (2006.01)

(52) U.S. Cl. ....................... 403/292; 403/175; 403/295; 403/403; 62/220.8; 62/309.4

(58) Field of Classification Search ................. 403/174, 403/175, 292, 295, 403, 265–266, 268–269, 403/232.1; 52/232, 309.4, 220.8, 220, 578, 52/484

See application file for complete search history.

(56) References Cited

U.S. PATENT DOCUMENTS

| | | | | |
|---|---|---|---|---|
| 689,320 | A * | 12/1901 | Kropfeld | 156/239 |
| 2,239,173 | A * | 4/1941 | Madsen | 52/202 |
| 3,590,544 | A * | 7/1971 | Shepherd | 52/506.06 |
| 3,835,614 | A * | 9/1974 | Downing, Jr. | 52/666 |
| 3,948,247 | A * | 4/1976 | Heilemann | 126/600 |
| 4,047,348 | A * | 9/1977 | McSweeney | 52/506.06 |
| 4,070,125 | A * | 1/1978 | Ollinger | 403/230 |
| 4,287,245 | A * | 9/1981 | Kikuchi | 428/34.2 |
| 4,488,739 | A * | 12/1984 | de Lange | 285/55 |
| 4,555,255 | A * | 11/1985 | Kissel | 55/355 |
| 4,570,391 | A * | 2/1986 | Quante et al. | 52/39 |
| 4,686,741 | A * | 8/1987 | Moore et al. | 16/438 |
| 4,925,218 | A * | 5/1990 | Kunz et al. | 285/93 |
| 5,180,068 | A * | 1/1993 | Vargo | 211/191 |
| 5,806,919 | A * | 9/1998 | Davies | 296/205 |
| 5,866,052 | A * | 2/1999 | Muramatsu | 264/46.6 |
| 6,003,274 | A * | 12/1999 | Wycech | 52/232 |
| 6,270,600 | B1 * | 8/2001 | Wycech | 156/79 |
| 6,287,666 | B1 * | 9/2001 | Wycech | 428/122 |
| 7,097,794 | B2 * | 8/2006 | McLeod et al. | 264/46.5 |

FOREIGN PATENT DOCUMENTS

| | | |
|---|---|---|
| JP | 2001-058264 | 3/2001 |
| JP | 2001278162 A | 10/2001 |
| JP | 2002-053067 | 2/2002 |
| JP | 2002173049 A | 6/2002 |

* cited by examiner

*Primary Examiner*—Daniel P. Stodola
*Assistant Examiner*—Nahid Amiri
(74) *Attorney, Agent, or Firm*—Rankin, Hill & Clark LLP

(57) ABSTRACT

A structure of joining in a T shape two frame members of U-shaped cross sections having openings is provided. At a joint of the first frame member and the second frame member, a reinforcing member mounted with unfoamed resin is set within the first and second frame members. A foamed resin fills the spaces between the first and second frame members and the reinforcing member. The first and second frame members, foamed resin and reinforcing member are integrally united, having a high strength at the joint of the two frame members.

15 Claims, 11 Drawing Sheets

10 39 14 16 11 12 35 31 3 24 25 26 17 17 34 36 22 32 23 33 4 21 15 3 17 38 37 13 4 38 17

51
51
51

13
11
41
38
1
38
37
21
12

51
13
51
51
26
24
25
11
41
54
36
②
54
37
21
12
35

FRAME JOINT STRUCTURE AND JOINING METHOD THEREOF

FIELD OF THE INVENTION

The present invention relates to a frame joint structure and a joining method thereof for use in joining frame members together into a T- or cross-shape.

BACKGROUND OF THE INVENTION

Production of vehicle frames involves joining pipes together with bonding material. It is known to use resin for the bonding material (see JP-A -2001-278162, for example).

It is also known to employ welding for joining pipes or frame members together to produce vehicle frames (see JP-A-2002-173049, for example).

A joining method of JP-A-2001-278162 will be described with reference to FIG. 15.

In the method of joining together pipes shown in FIG. 15, a heat foamable adhesive S is applied to a pipe 101 constituting a frame member, and then the pipe 101 is press-fitted into a joint protrusion 103 of a lug 102. The joint protrusion 103 has ribs 103*a*, 103*b* on its inner surface. Thereafter, by heating the adhesive S by a heating means into a foam, the adhesive S extends into narrow gaps between the pipe 101 and the lug 102 at the joint, bonding the joint surfaces, which results in a simplified and economic frame member/pipe joining operation and an increased bonding strength.

In the above pipe joining method, however, the pipe 101 is press-fitted into the joint protrusion 103, which requires improving the precision of the outside diameter of the pipe 101 to which the heat foamable adhesive S is applied and the precision of the inside diameter of the ribs 103*a*, 103*b* of the joint protrusion 103, causing increased production costs.

Now, a joining method of JP-A-2002-173049 will be described with reference to FIG. 16.

A frame structure shown in FIG. 16 includes a first member 201, a second member 202, and an intermediate member 203 interposed between the first member 201 and the second member 202. These members are welded together. A foam filler 205 is put into a space 204 defined by the first member 201 and the intermediate member 203. The space 204 is filled with the foam filler 205 to provide a sufficient strength to the frame component.

The above frame component, however, has a structure in which the first member 201, second member 202 and intermediate member 204 are welded together, which requires that those members be made of the same material. Combination of different materials leads to reductions in weight and size, but combination of different materials takes time to weld, increasing production costs. Further, to contact members of different materials with one another at welds can cause galvanic corrosion at the contacts, making it difficult to maintain sufficient strength.

There is thus a demand for a frame joint structure and a joining method thereof which allow reduction in production costs and, increase in strength and prevention of galvanic corrosion.

SUMMARY OF THE INVENTION

According to an aspect of the present invention, there is provided a frame joint structure which comprises: a first frame member of a U-shaped cross section having a first sidewall, a second sidewall, a bottom wall and an opening; a second frame member, similar to the first frame member, of a U-shaped cross section having an opening, having an end portion connected to at least one of the first sidewall and the second sidewall of the first frame member; a reinforcing member extending into the first frame member and the second frame member by predetermined lengths at a joint of the first frame member and the second frame member; a plate member closing the openings of the first and second frame members to form closed cross sections; and a foamed resin filling spaces defined between the plate member, the first and second frame members, and the reinforcing member.

The spaces between the first and second frame members and the reinforcing member are filled with the foamed resin, so that the first and second frame members, foamed resin and reinforcing member are integrally united. As a result, the strengths of the reinforcing member and the foamed resin can be added to the joint between the first frame member and second frame member, increasing the bonding strength of the first frame member and the second frame member. The increased bonding strength allows the first and second frame members to be made thinner in plate thickness and to be reduced in weight.

The reinforcing member preferably has a T-shape or an L shape in a plan view to increase the bonding strength of the two frame members.

If the plate member and the first and second frame members are made from a metal material different from a metal material from which the reinforcing member is made in the present invention, the foamed resin interposed therebetween prevents direct contact between the reinforcing member, the frame members and other components, thus preventing corrosion resistance.

According to another aspect of the present invention, there is provided a joining method of a frame joint structure, which comprises the steps of:temporarily securing by welding an end portion of a second frame member of a U-shaped cross section having an opening to a first frame member of a U-shaped cross section having an opening; mounting a foam resin to a reinforcing member to be extended by predetermined lengths into the first frame member and the second frame member at a temporarily welded joint; setting the reinforcing member mounted with the foam resin within the first frame member and within the second frame member; closing the openings of the first and second frame members by a plate member so that the frame members have closed cross sections; and heating and foaming the foam resin within the first and second frame members.

In the frame member temporarily securing step, spot-welding operation can be finished with the second frame member being provisionally secured, resulting in a small number of nuggets by spot welding and an improved efficiency in spot-welding operation.

In the reinforcing member setting step, it is only required to wrap unfoamed resin to be foamed resin around the reinforcing member and then place the reinforcing member, together with the unfoamed resin, within the first and second frame members at the joint, which involves no precise positioning effort and results in improved productivity.

The above joining method preferably further comprises the step of applying a coat of paint to a surface of the plate member after the closed cross-section forming step; wherein the heat foaming step comprises heat drying of the applied paint. That is, the unfoamed resin is foamed by heat for drying the applied paint, so that heating costs and equipment costs for heat foaming can be reduced. Further reduction in production costs can thus be achieved.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
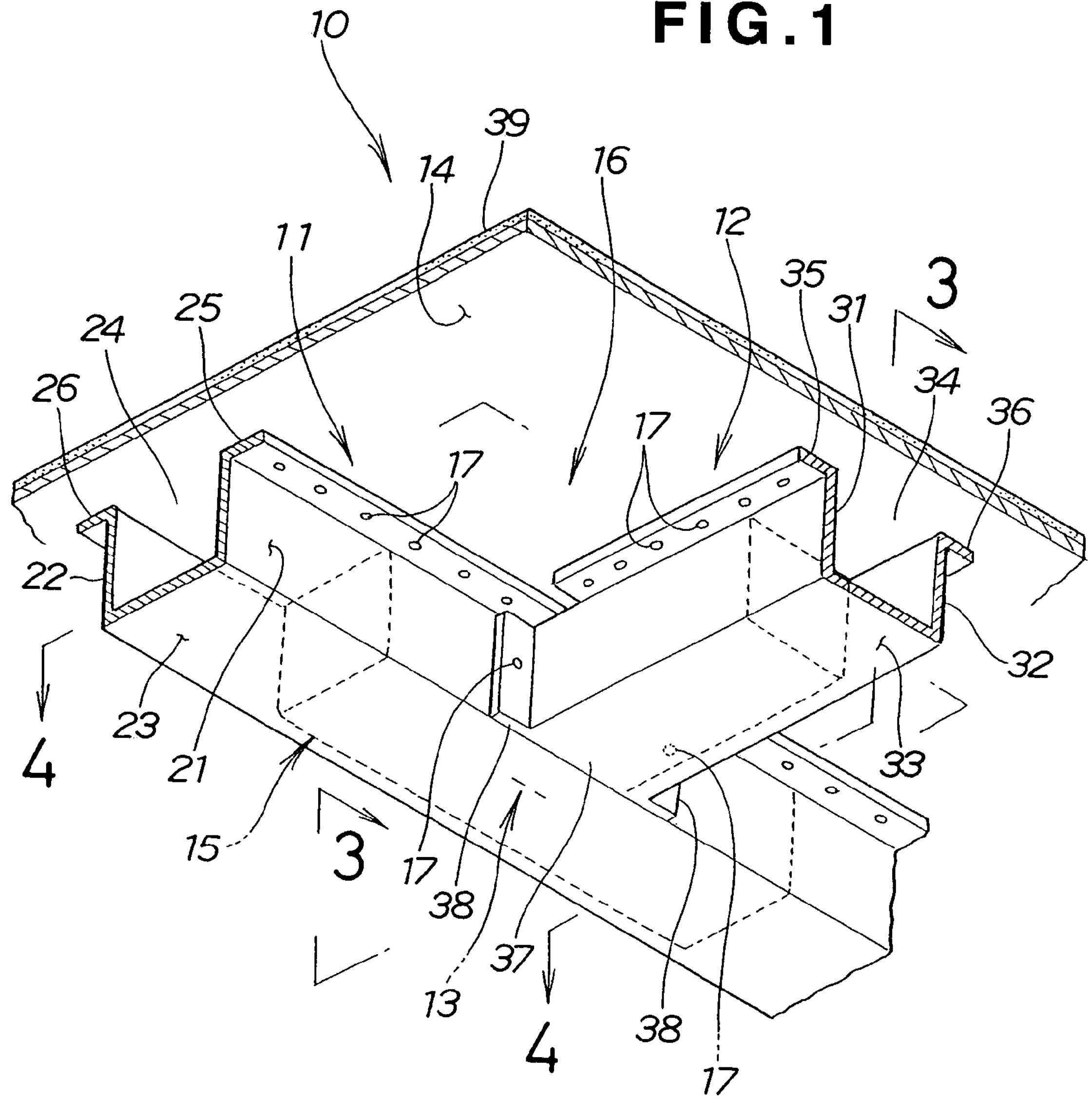
FIG. 1 is a perspective view from below of a frame joint structure according to the present invention.

Initial reference is made to FIGS. 1 to 4 illustrating a frame joint structure of the present invention.

A frame joint structure 10 of the present invention includes a first frame member 11, a second frame member 12 connected to the first frame member 11, a reinforcing member 13 provided within the first and second frame members 11, 12, a plate member 14 welded to the first and second frame members 11, 12, and a foamed resin 15. Reference numeral 16 denotes a joint, and 17 welds (nuggets) formed by a spot-welding device.

The first frame member 11 has a U-shaped cross section, including a first sidewall 21, a second sidewall 22, a bottom wall 23, an opening 24, a flange 25 formed at an edge of the first sidewall 21, and a flange 26 formed at an edge of the second sidewall 22. The material of the first frame member 11 is, for example, steel or an aluminum alloy.

The second frame member 12 is similar to the first frame member 11, having a U-shaped cross section, including a first sidewall, second sidewall and bottom wall 31, 32 and 33, an opening 34, a flange 35 formed at an edge of the first sidewall 31, a flange 36 formed at an edge of the second sidewall 32, and flanges 38, 38 formed at an end portion 37. The material of the second frame member is, for example, steel or an aluminum alloy.

The plate member 14 is a thin plate for closing the opening 24 of the first frame member 11 and the opening 34 of the second frame member 12 to form closed cross sections. Reference numeral 39 denotes a coat formed over the plate member 14. The material of the plate member 14 is steel.

Figure 2:
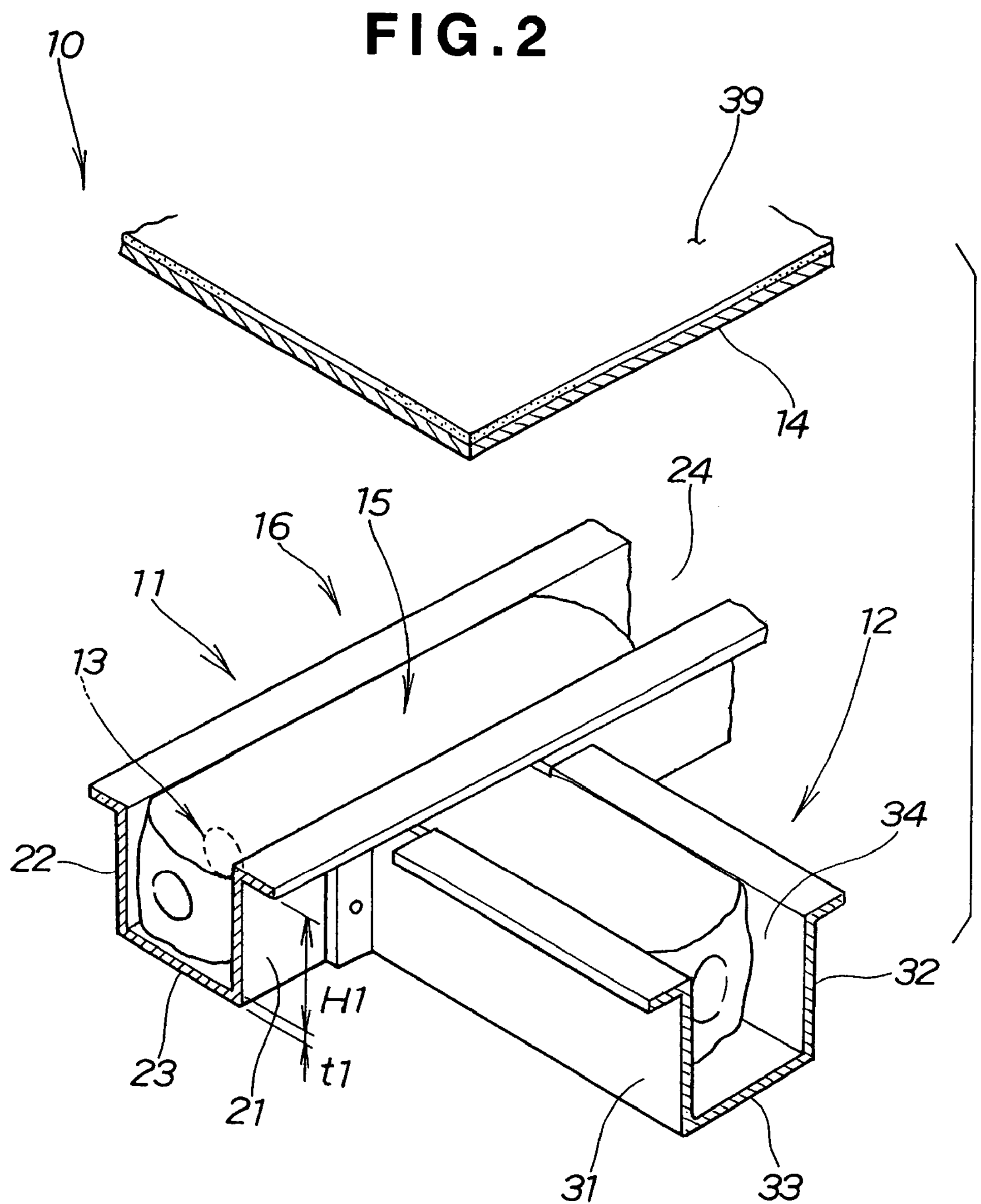
FIG. 2 is an exploded perspective view from above of the frame joint structure shown in FIG. 1.

FIG. 2 illustrates a state in which the plate member 14 is removed. As already described, the frame joint structure 10 includes the reinforcing member 13 extended into the first frame member 11 and the second frame member 12 at the joint 16, the plate member 14 closing the openings 24, 34 of the first and second frame members 11, 12 to form closed cross sections, and the foamed resin 15 filing the spaces between the plate member 14, the first and second frame members 11, 12 and the reinforcing member 13.

Figure 4:
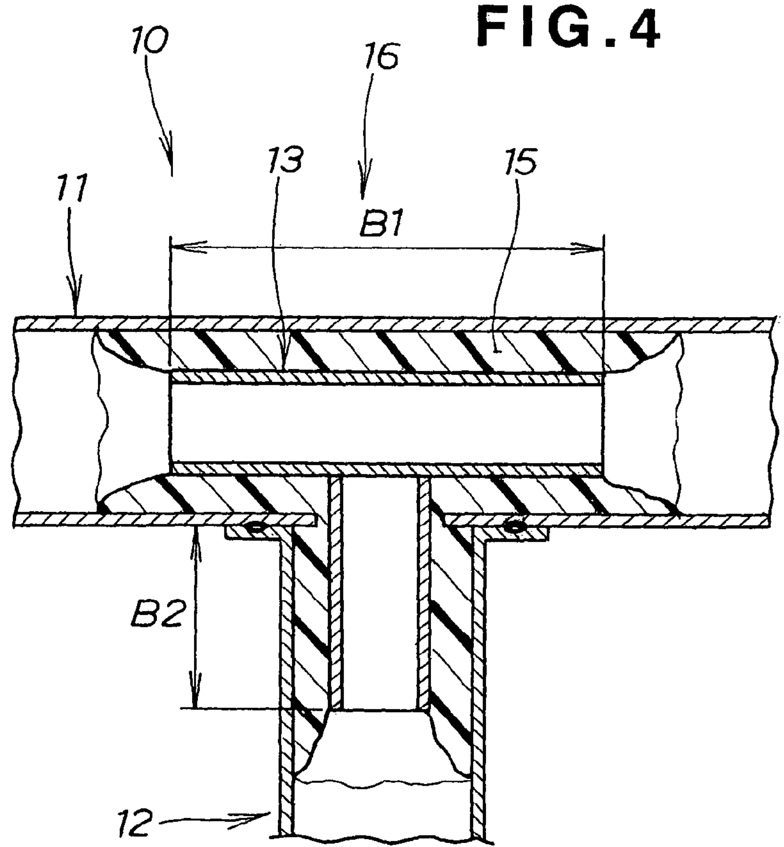
FIG. 4 is a cross sectional view taken along line 4 in FIG. 1.

The reinforcing member 13 is a T-shaped combination of pipes as shown in FIG. 4 and reinforces the first and second frame members 11, 12 from within. The material of the reinforcing member 13 is steel, and steel pipes are used therefor. Alternatively, pipes of an aluminum alloy or any other material can be used.

The foamed resin 15 is an epoxy resin to which a foaming agent is added, which is formed by foaming an unfoamed resin under a temperature equal to or higher than 180° C. For the foamed resin 15, "REINFOCDR-912" from Sika Corp. is used.

Reference sign t1 shown in FIG. 2 indicates the plate thickness of the first frame member 11, H1 the width of the first sidewall 21. The widths of the second sidewall 22 and the bottom wall 23 are equal to the width H1 of the first sidewall 21.

The plate thickness and the widths of the first sidewall, second sidewall and bottom wall 31, 32 and 33 of the second frame member 12 are approximately equal to those of the first frame member 11.

Figure 3:
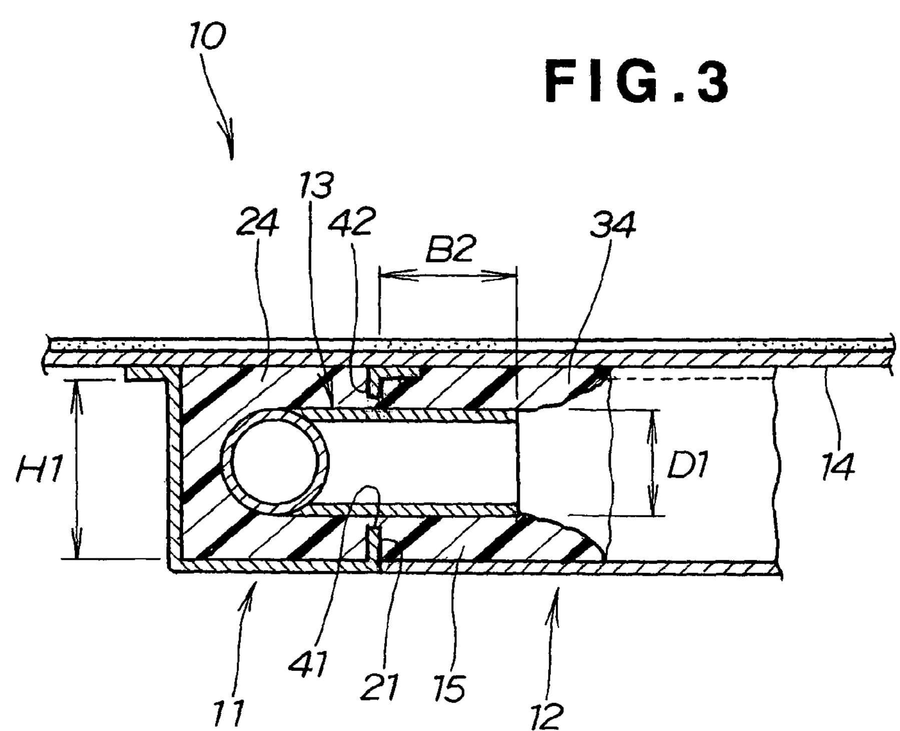
FIG. 3 is a cross-sectional view taken along line 3-3 in FIG. 1.

As shown in FIGS. 3 and 4, the openings 24, 34 of the first and second frame members 11, 12 are closed by the plate member 14 to have closed cross sections. The reinforcing member 13 extends into the second frame member 12 by a predetermined length B2. The spaces between the plate member 14, first and second frame members 11, 12 and reinforcing member 13 are filled with the foamed resin 15.

The outside diameter of the reinforcing member 13 is D1 which is smaller than H1 (the width of the first sidewall 21).

A fitting hole 41 larger than the outside diameter D1 of the reinforcing member 13 is formed in the first sidewall 21 of the first frame member 11 with a portion of the first sidewall 21 left to provide a connecting portion 42.

As shown in FIG. 4, being extended into the second frame member 12 by the predetermined length B2, the reinforcing member 13 is also extended into the first frame member 11 by a predetermined length B1, and the spaces between the first and second frame members 11, 12 and the reinforcing member 13 are filled with the foamed resin 15.

As shown in FIGS. 3 and 4, the frame joint structure 10 of the present invention includes the reinforcing member 13 extended into the first frame member 11 and the second frame member 12 at the joint 16 by the predetermined lengths B1, B2, the plate member 14 closing the openings 24, 34 of the first and second frame members 11, 12 to form closed cross sections, and the foamed resin 15 filling the spaces between the plate member 14, first and second frame members 11, 12 and reinforcing member 13, so that the foamed resin 15 and the reinforcing member 13 can be integrally united within the first and second frame members 11, 12, adding a desired strength of the reinforcing member 13 and a desired strength of the foamed resin 15 to the strength of the first frame member 11 and the strength of the second frame member 12 at the joint 16, and increasing the strength of the first frame member 11 and the strength of the second frame member 12 at the joint 16.

The frame joint structure 10 in this embodiment is provided with the reinforcing member 13, plate member 14 and foamed resin 15 to increase the strengths of the first and second frame members 11, 12 at the joint 16. As a result, as compared with the plate thickness of first and second frame members 11,12 before employing the frame joint structure 10, the plate thickness of the first and second frame members 11, 12 can be made thinner, resulting in reduced weights.

With the first and second frame members 11, 12 made from an aluminum alloy and with the reinforcing member 13 made from steel, the frame joint structure 10 can have a reduced weight and also have an increased strength.

As shown in FIG. 3, the frame joint structure 10 is provided with the reinforcing member 13, the plate member 14, and the foamed resin 15 filling the spaces between the first and second frame members 11, 12 and the reinforcing member 13 whose outside diameter D1 is set smaller than the width H1 of the first sidewall 21, so that the foamed resin 15 allows the reinforcing member 13 to be integrally united with the first and second frame members 11, 12 at the joint 16. More specifically, for using the reinforcing member 13, the first sidewall 21 of the first frame member 11 is formed with the fitting hole 41 larger than the outside diameter D1 of the reinforcing member 13 with a portion of the first sidewall 21 left to provide the connecting portion 42 to reduce reduction in strength in the vicinity of the fitting hole 41.

Now, a joining method of the frame joint structure 10 in the above embodiment will be described with reference to FIGS. 5 to 7.

Figure 5:
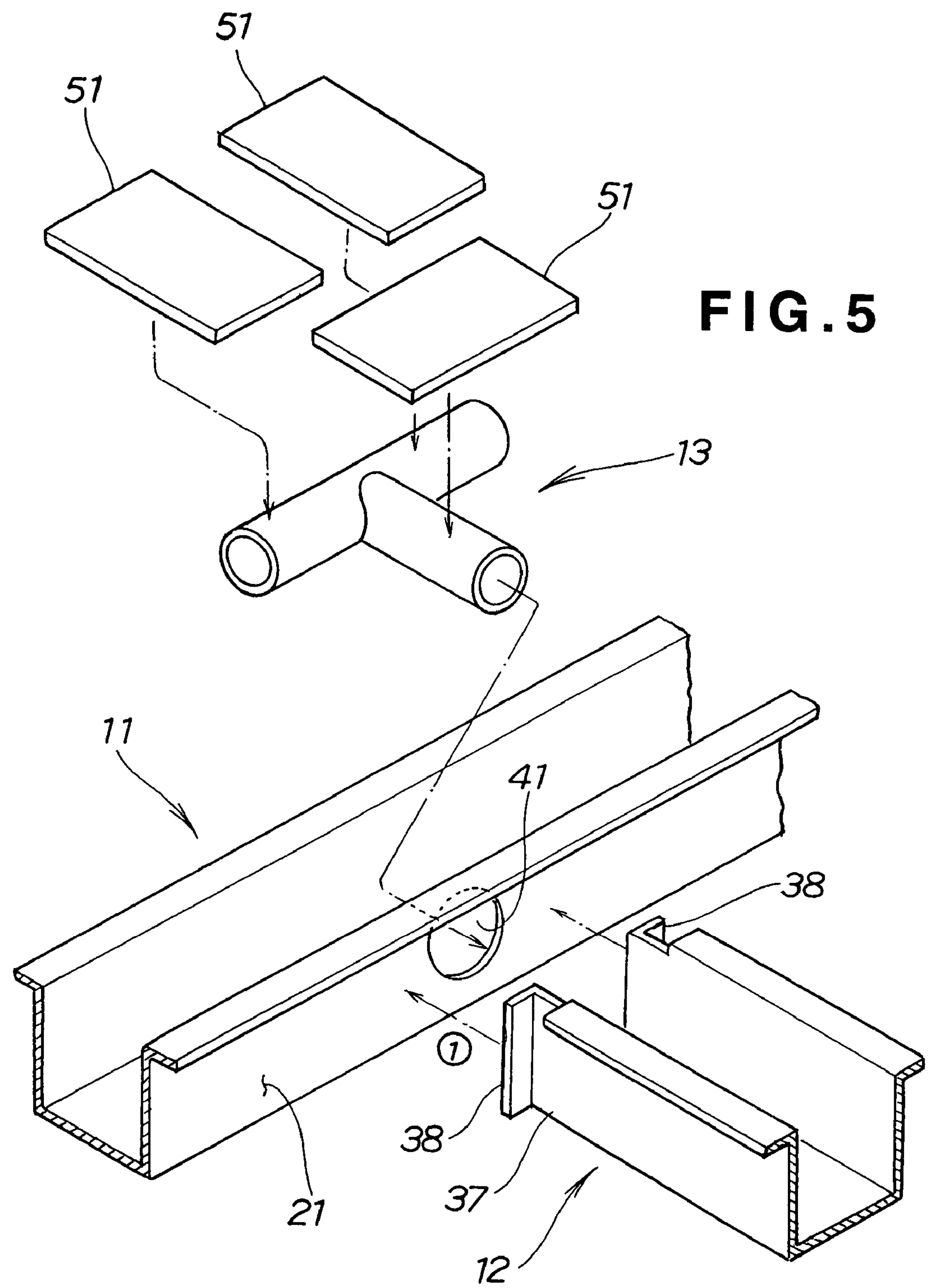
FIG. 5 is a perspective view of a state before a second frame member is welded to a first frame member and unfoamed resins are mounted to a reinforcing member in a method of joining the two frame members.

FIG. 5 illustrates a temporary securing step of the frame Members 11, 12 and the mounting of foam resin.

The temporary securing step of the frame members 11, 12 will be described. First, the first frame member 11 and the second frame member 12 are prepared. The flanges 38, 38 at the end portion 37 of the second frame member 12 are put on the first sidewall 21 of the first frame member 11 as shown by arrows ① and spot-welded, whereby to temporarily secure the second frame member 12 to the first frame member 11.

Then, foam resin is mounted. The reinforcing member 13 and a plurality of unfoamed resin sheets 51 to be the foamed resin 15 (see FIGS. 4-5) are prepared. The unfoamed resin sheets 51 are wrapped around the reinforcing member 13.

Figure 6:
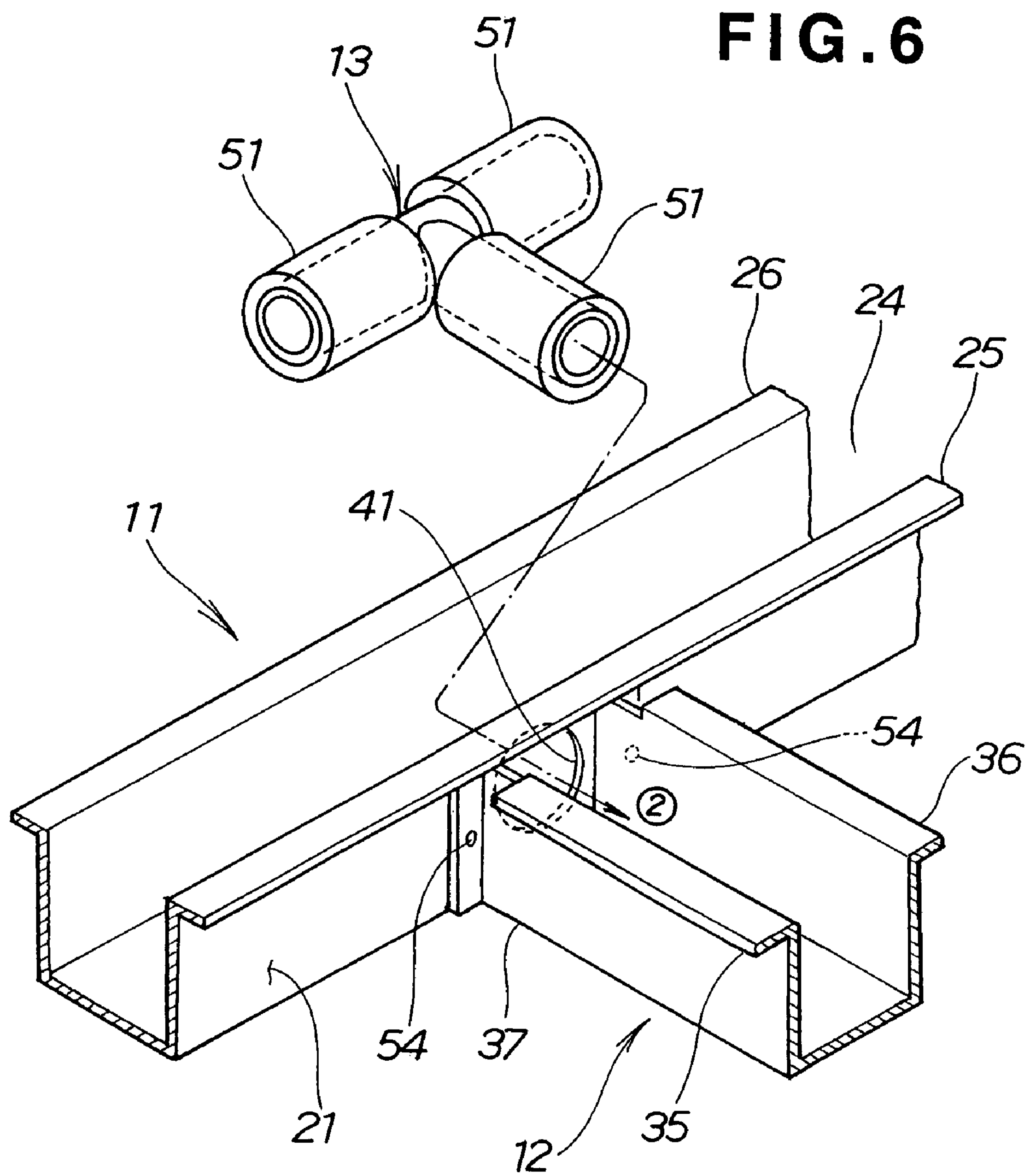
FIG. 6 is a perspective view of a state in which the two frame members are temporarily welded together from the state shown in FIG. 5 and the unfoamed resins are mounted to the reinforcing member.

FIG. 6 illustrates a state in which the end portion 37 of the second frame member 12 is temporarily secured to the first sidewall 21 of the first frame member 11 at nuggets 54, 54 by spot welding and the unfoamed resin sheets 51 are wrapped around the reinforcing member 13.

In the above frame member temporary securing step, the spot welding operation can be finished with the second frame member 12 being provisionally secured, resulting in a reduced number of welds 54 by spot welding and an increased efficiency in spot welding operation.

Then, the unfoamed resin sheet 51, together with the reinforcing member 13, is put through the fitting hole 41 formed in the first frame member 11 as shown by arrow ②.

Figure 7A:
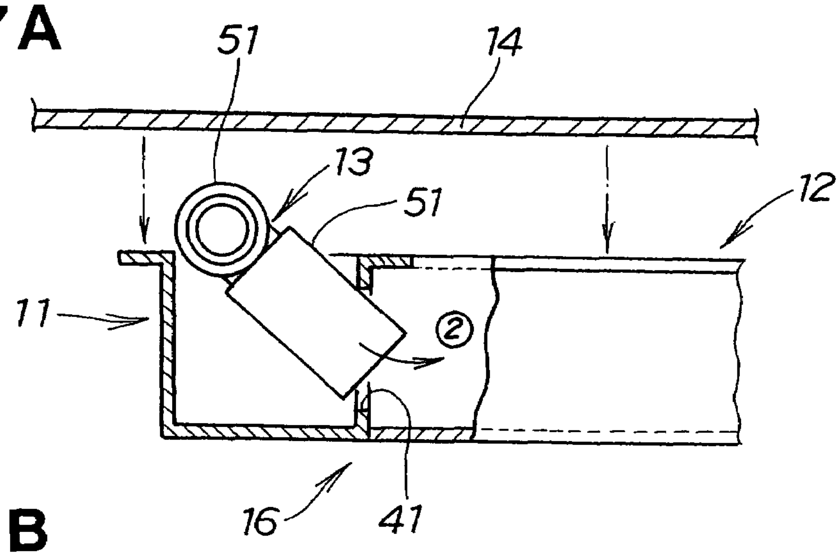
FIG. 7A is a cross-sectional view of a state in which the reinforcing member is set within the first and second frame members.
Figure 7B:
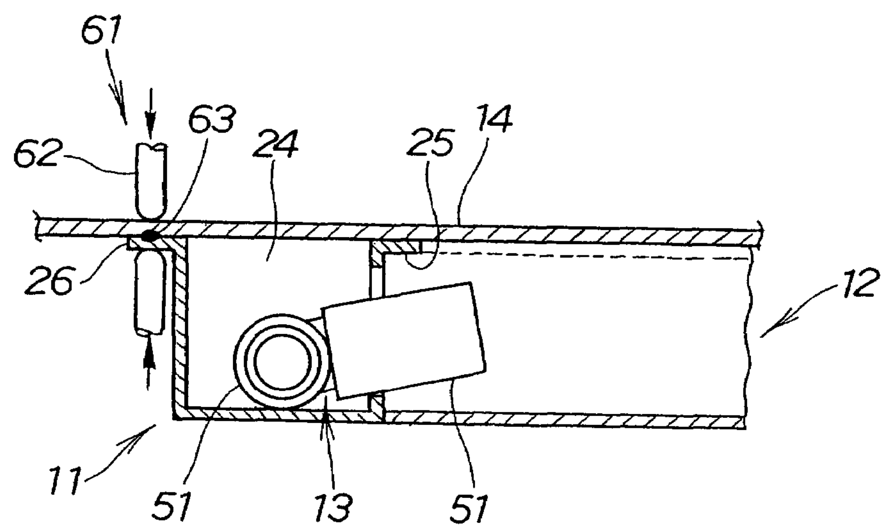
FIG. 7B is a cross-sectional view of a state in which the first and second frame members are spot-welded to a plate member to close openings of the frame members.
Figure 7C:
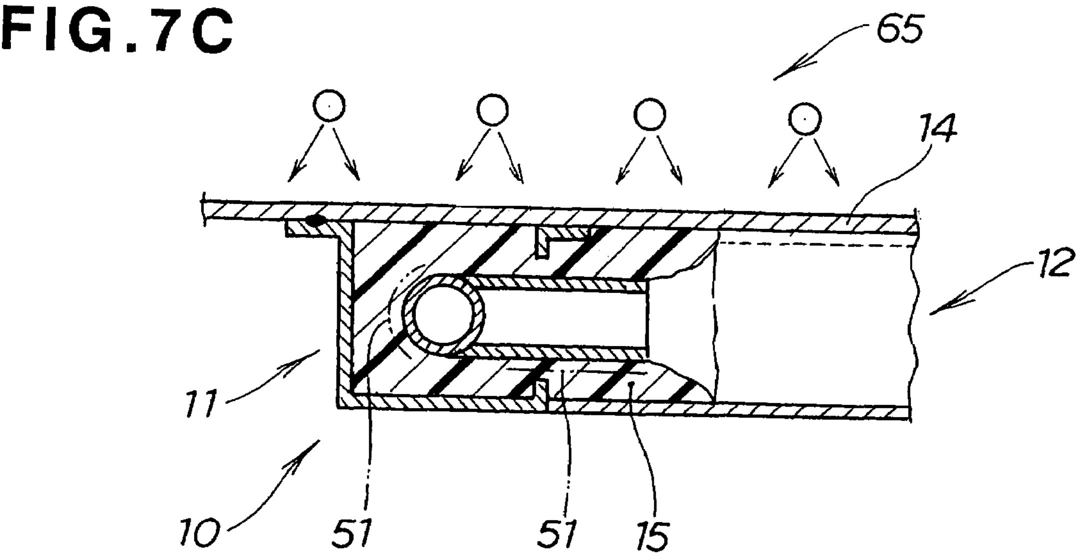
FIG. 7C is a cross-sectional view of a state in which the unfoamed resins are foamed by heating of a heating means.

FIGS. 7A to 7C illustrate the step of setting the reinforcing member 13, the step of forming closed cross sections and the step of heat foaming.

In FIG. 7A, the reinforcing member setting step is performed. As already described, the unfoamed resin sheet 51, together with the reinforcing member 13, is put through the fitting hole 41 formed in the first frame member 11 as shown by arrow ②, and the reinforcing member 13, together with the unfoamed resin sheets 51 mounted on the reinforcing member 13, is set within the first frame member 11 and within the second frame member 12 at the temporarily welded joint 16.

In FIG. 7B, the closed cross section forming step is performed. The plate member 14 is put over the openings 24, 34 of the first and second frame members 11, 12, and is spot-welded to the flanges 25, 26, 35 and 36 of the first and second frame members 11, 12 by electrodes 62 of a spot welding device 61 so that the first and second frame members 11, 12 have dosed cross sections. Reference numeral 63 denotes a nugget.

In the reinforcing member setting step, it is thus only required that the reinforcing member 13 mounted with the unfoamed resin sheets 51 be placed within the first and second frame members 11, 12 at the joint 16, which involves no precise positioning effort and results in increased productivity and reduced production costs. Further, the manufacturing of the first and second frame members 11, 12 does not take time, increasing the production efficiency of the first and second frame members 11, 12, and the manufacturing of the reinforcing member 13 does not take time, increasing the production efficiency of the reinforcing member 13, which leads to reduced production costs.

In FIG. 7C, the heat foaming step is performed. The unfoamed resin sheets 51 to be a foamed resin within the first and second frame members 11, 12 are heated to a temperature above about 180° C. by a heating means 65. The unfoamed resin sheets 51 are foamed, resulting in the foamed resin 15, and completing the frame joint structure 10.

Figure 8A:
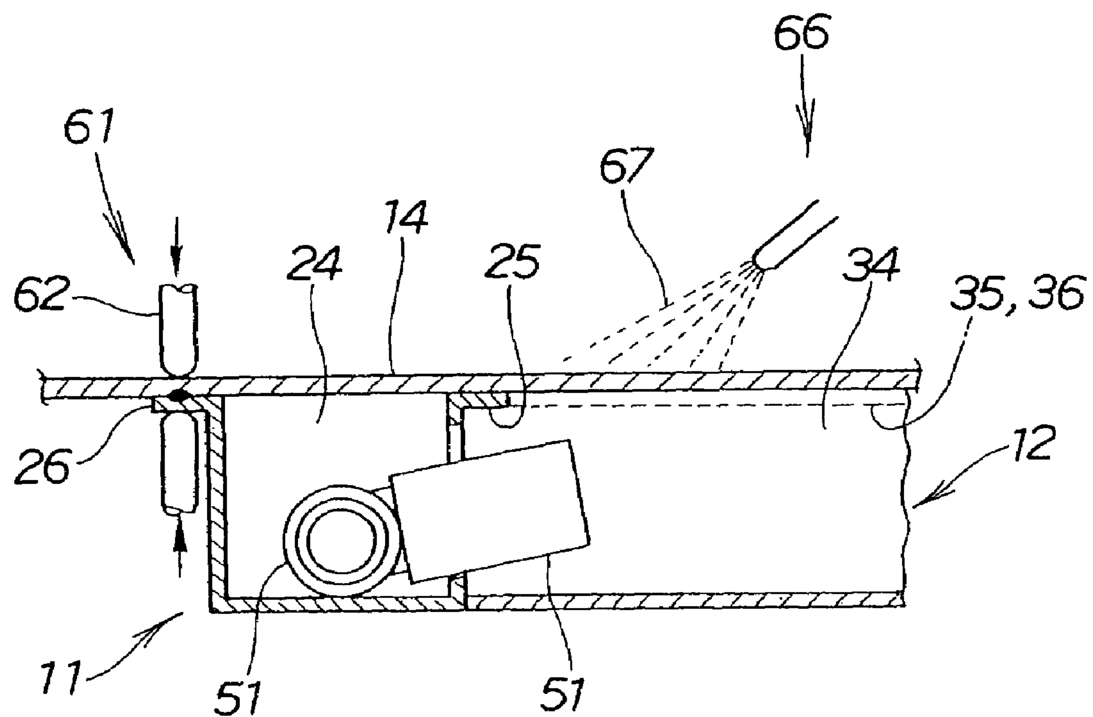
FIGS. 8A and 8B are cross-sectional views of an example in which a coat of paint is applied to the surface of the plate member.
Figure 8B:
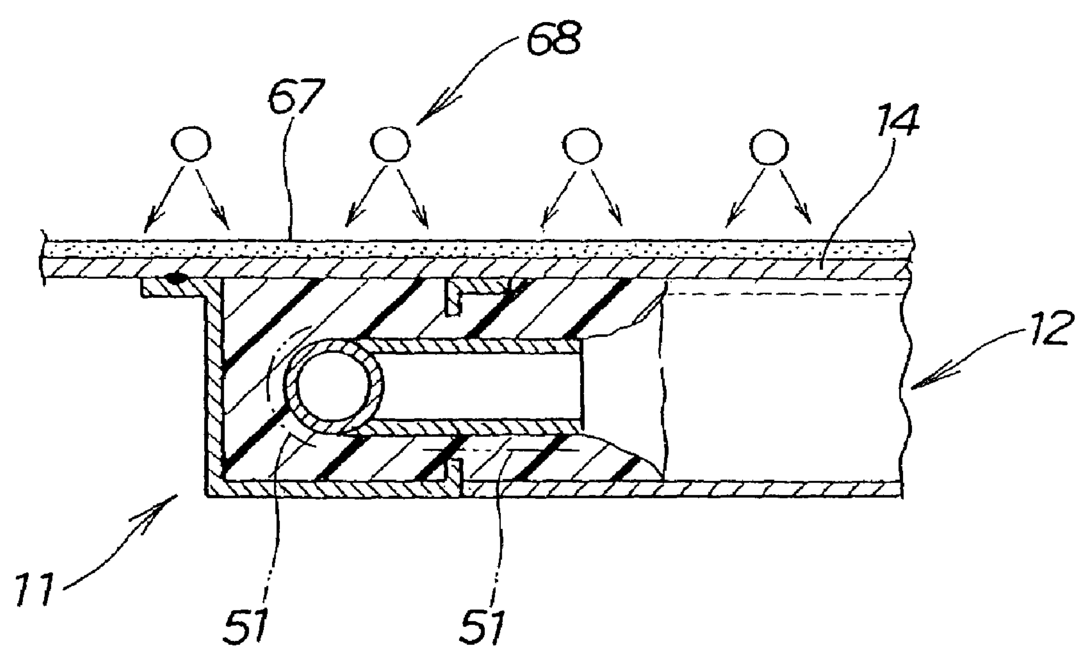

FIGS. 8A and 8B illustrate the step of coating the plate member 14 after the closed cross section forming step illustrated in FIG. 7B.

In FIG. 8A, first, the closed cross section forming step is performed in which the plate member 14 is put over the openings 24, 34 of the first and second frame members 11, 12, and the plate member 14 is spot welded to the flanges 25, 26, 35 and 36 of the first and second frame members 11, 12 by the electrodes 62 of the spot-welding device 61 so that the first and second frame members 11, 12 have closed cross sections. Then, the structure is conveyed to a paint shop in which a painting device 66 applies predetermined paint 67 to the surface of the plate member 14. A painting area is not limited.

In FIG. 8B, the paint 67 is then heated and dried by a drying device 68. At that time, the paint 67 and the plate member 14 are heated such that the temperature of the unfoamed resin sheets 51 is above about 180° C. That is, the unfoamed resin sheets 51 are foamed by the heat for drying the paint 67.

As just described, the joining method shown in FIGS. 8A and 8B includes the coating step in which the unfoamed resin sheets 51 are foamed by heat for drying the paint 67, resulting in reductions in heating and equipment costs for heat foaming. Thus production costs can be further reduced.

Figure 9:
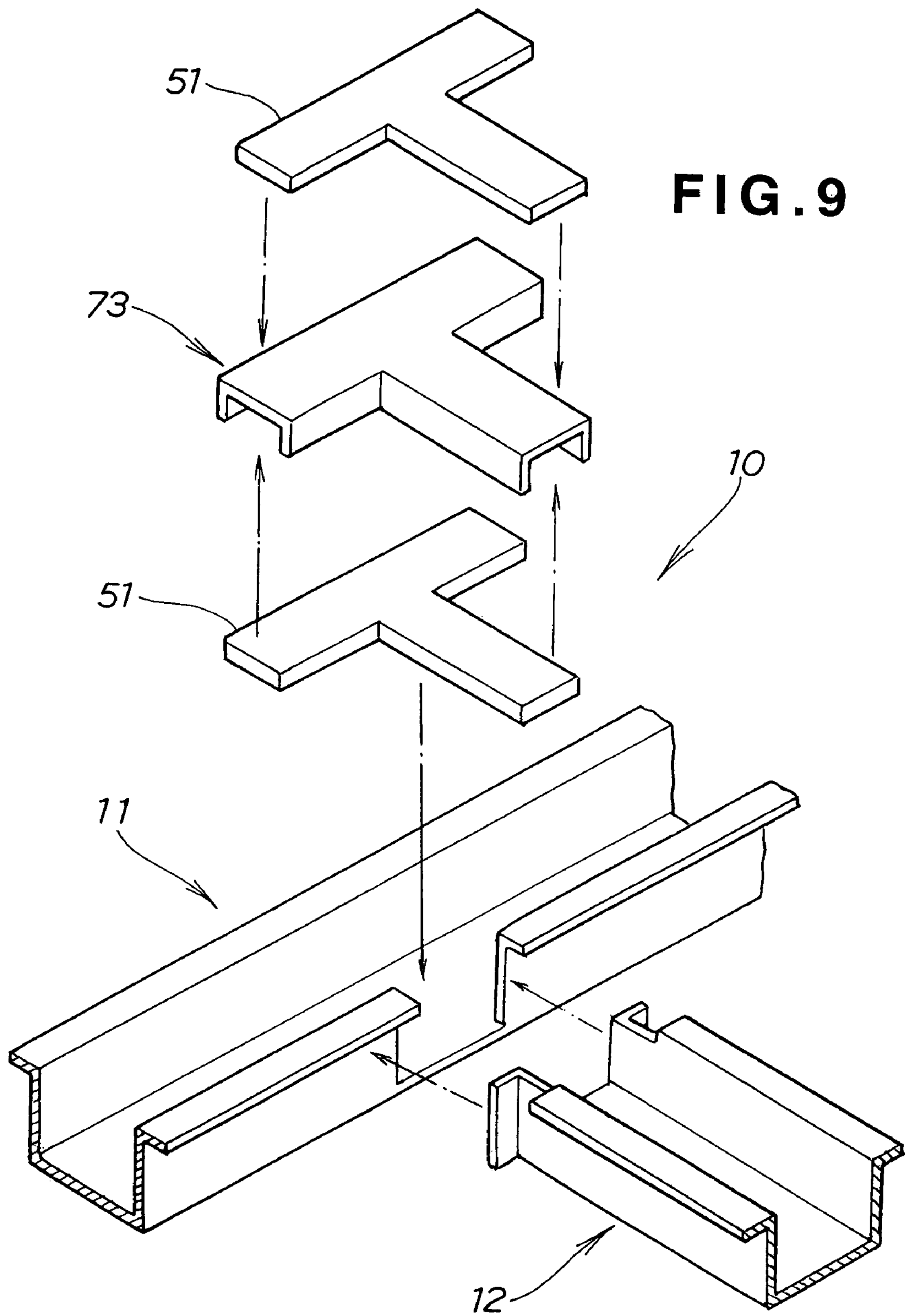
FIGS. 9 to 11 are diagrams of an example in which a reinforcing member formed by press-molding a steel plate into a T shape is used.
Figure 10:
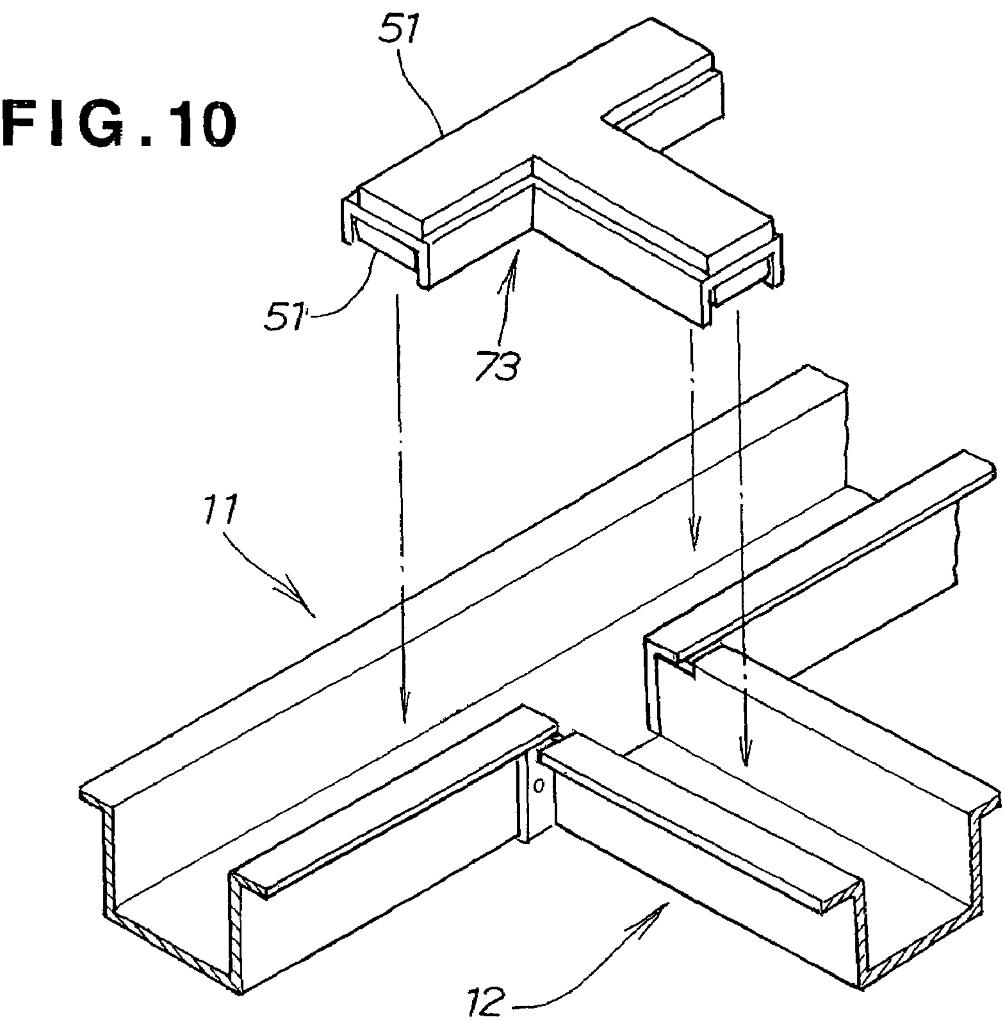
Figure 11:
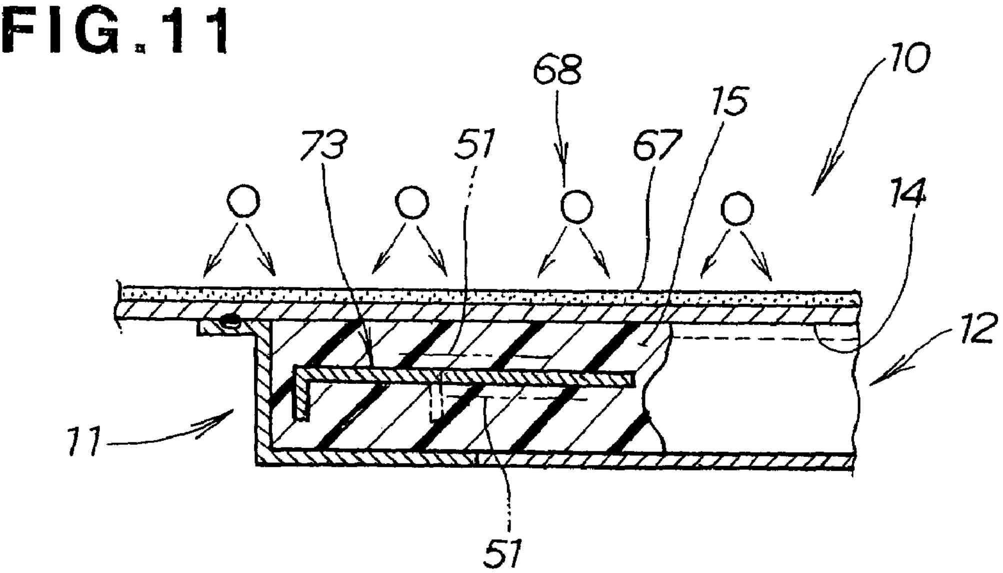

FIGS. 9 to 11 illustrate a frame joint structure 10 using a reinforcing member 73 according to a second embodiment.

The reinforcing member 73 of the second embodiment is of a T-shaped steel plate. The reinforcing member 73 is produced by press molding into a channeled shape. Two unfoamed resin sheets 51 with a T-shape like the reinforcing member 73 are prepared.

As shown in FIG. 10, the two unfoamed resin sheets 51 are mounted to the upper surface and the lower surface of the reinforcing member 73. The reinforcing member 73 mounted with the unfoamed resin sheets 51 is, as shown by arrows, set within a first frame member 11 and a second frame member 12 which are temporarily welded together in a T-shape by spot welding.

As shown in FIG. 11, after a plate member 14 is spot welded to the first and second frame members 11, 12, a coat of paint 67 is applied to the surface of the plate member 14. A drying device 68 heat dries the applied paint 67, foaming the unfoamed resin sheets 51 by heating. A foamed resin 15 is thus obtained and the frame joint structure 10 is completed.

In the second embodiment, as described above, the reinforcing member 73 is a press-molded product, which increases the productivity of the reinforcing member 73.

Figure 12:
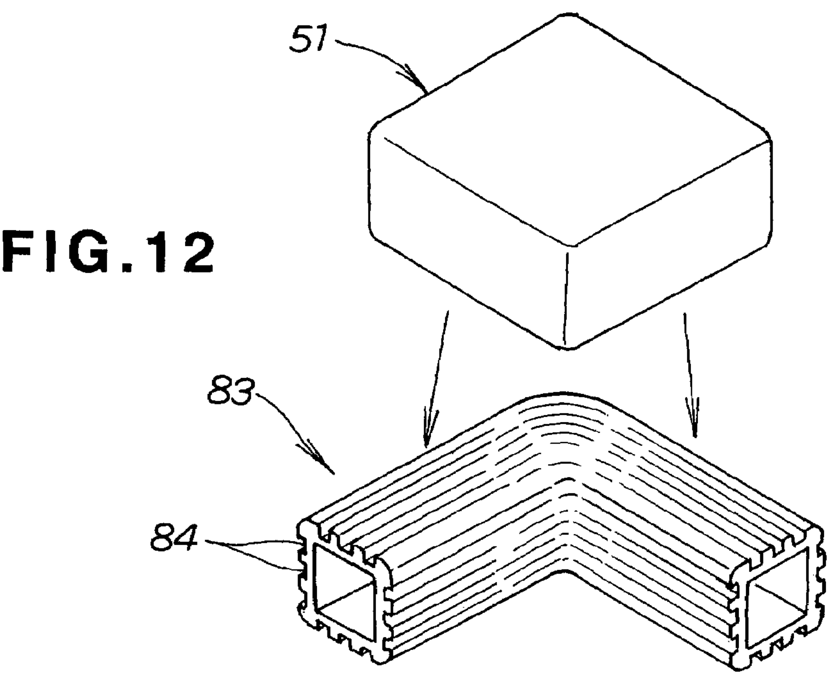
FIGS. 12 to 14 are diagrams of an L-shaped reinforcing member of a rectangular cross-section pipe and a joined state of frame members using the reinforcing member.
Figure 13:
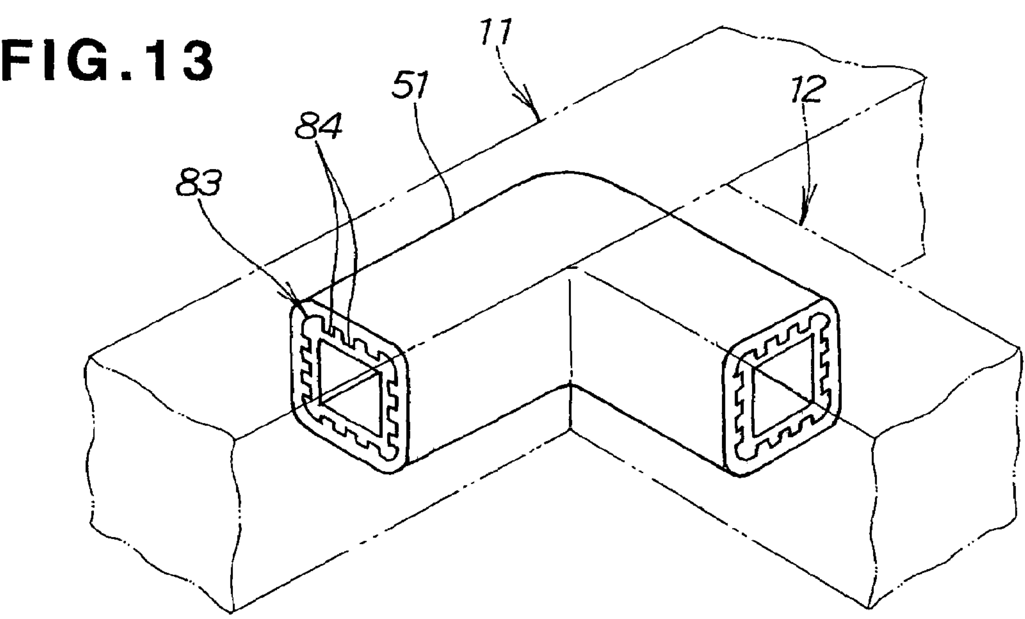
Figure 14:
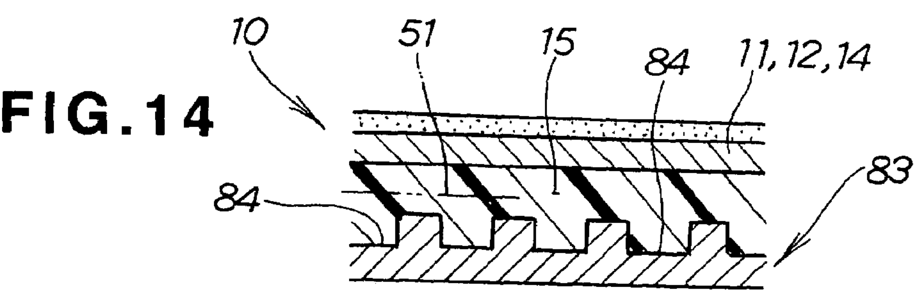
Figure 15:
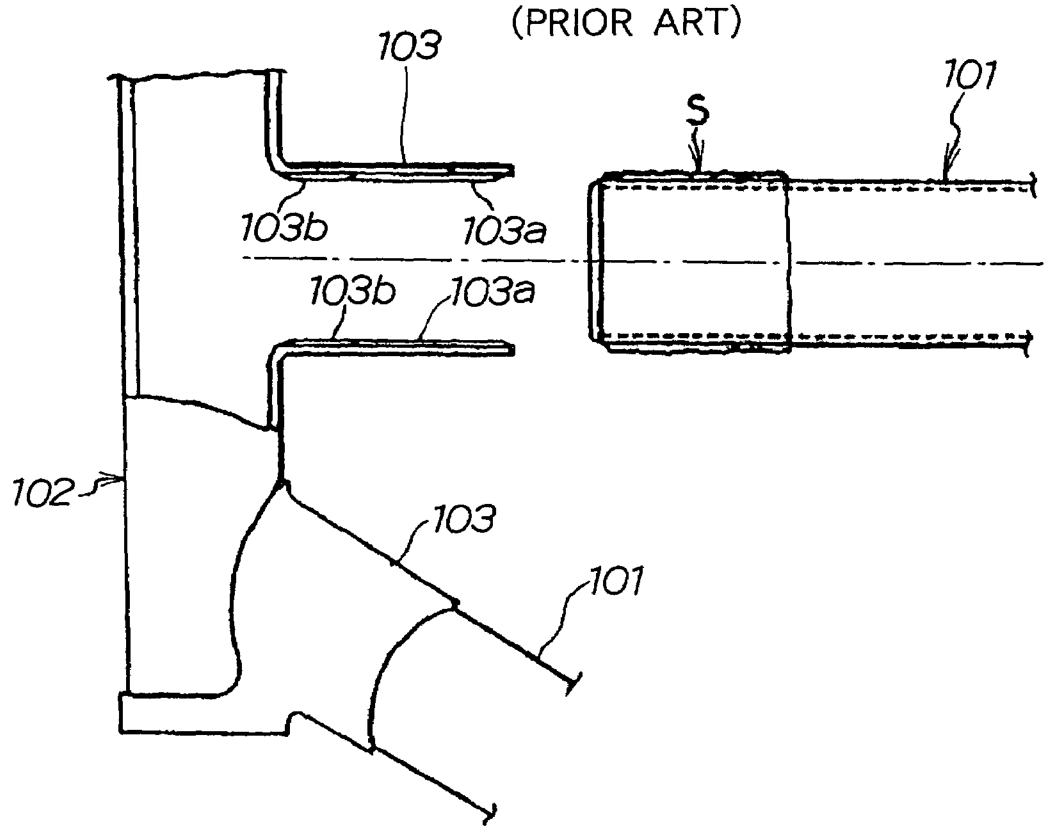
FIG. 15 is a diagram of a conventional method of joining bicycle frame pipes.
Figure 16:
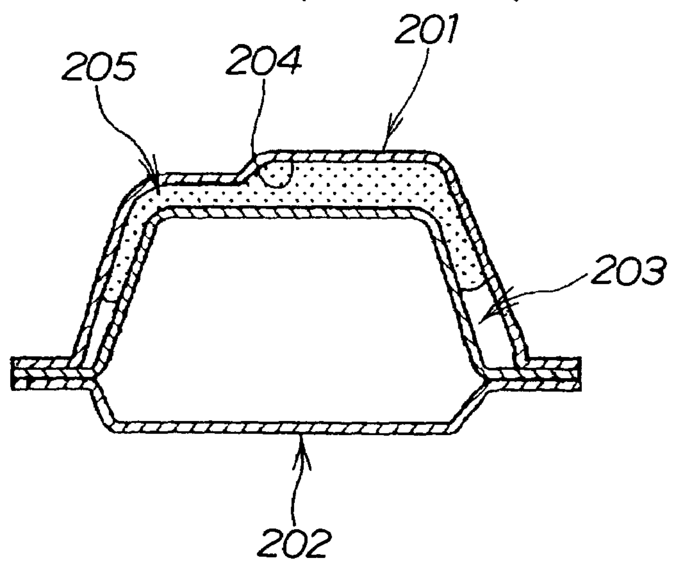
FIG. 16 is a diagram of a conventional frame connection including a foam filler.

FIGS. 12 to 14 illustrate a reinforcing member 83 and a frame joint structure 10 using the reinforcing member 83 according to a third embodiment.

The reinforcing member 83 shown in FIG. 12 is produced by extruding an aluminum alloy into a rectangular cross-section pipe and bending the extrusion into an L shape. The reinforcing member 83 has a plurality of grooves 84 formed in its exterior surface. The grooves 84 are formed during extrusion molding. The grooves 84 can be of any shape.

An unfoamed resin material 51 is similar to the unfoamed resin sheets 51 shown in FIG. 5 and is soft. The unfoamed resin material 51 is mounted to the outer periphery of the reinforcing member 83. The unfoamed resin material 51 is mounted to the reinforcing member 83 in such a manner that the unfoamed resin material 51 is pressed into the grooves 84 to be secured to the external surface of the reinforcing member 83 as shown in FIG. 13.

In this foam resin mounting step, the reinforcing member 83 formed in its external surface with the grooves 84 is used and the soft unfoamed resin material 51 is used, so that the unfoamed resin material 51 can be fixed in the grooves 84.

As in the steps shown in FIGS. 7A to 7C or FIGS. 8A and 8B, the reinforcing member 83 having the unfoamed resin material 51 is set within first and second frame members 11, 12 and the unfoamed resin material 51 is heated to a temperature above about 180° C. and foamed.

The unfoamed resin material 51 is thus foamed to obtain a foamed resin 15 filling the spaces within the first and second frame members 11, 12 as shown in FIG. 14, thereby to obtain the frame joint structure 10.

The above frame joint structure 10 uses an aluminum alloy extrusion for the reinforcing member 83 to reduce the weight and also increase the production efficiency of reinforcing members by extrusion molding.

Further, the above frame joint structure 10 has the foamed resin 15 filling the spaces between the aluminum alloy reinforcing member 71 and the first and second steel frame members 11, 12 (including the plate member 14), avoiding direct contact of the aluminum alloy to the steel, so that galvanic corrosion can be prevented.

The formation of the grooves 84 in the outer periphery of the reinforcing member 83 allows the foamed resin 15 to be fitted in the grooves 84, increasing the bonding power of the reinforcing member 83 and the foamed resin 15, and resulting in a frame joint structure of high strength.

In the embodiment shown in FIG. 3, with the first and second frame members 11, 12 made of steel and with the reinforcing member 13 made of an aluminum alloy, the aluminum alloy can be prevented from directly contacting the steel to prevent galvanic corrosion. If the materials of the members are switched, galvanic corrosion can be prevented as well.

In the embodiment shown in FIG. 1, an example of connecting the second frame member 12 to the first frame member 12 in a T shape is illustrated. It is also possible to connect them in a cross shape and form the reinforcing member 13 in a cross shape for combination, thereby to obtain a frame joint structure in a cross shape.

FIG. 5 exemplarily illustrates the unfoamed resin sheets 51 in a sheet shape and FIG. 12 exemplarily illustrates the unfoamed resin material 51 in a soft mass. Unfoamed resin, however, can be of any shape, and may be shaped in a tape to be wound around a reinforcing member.

In the present invention, the foamed resin 15 (including the unfoamed resin sheets 51) has any ingredients.

Obviously, various minor changes and modifications of the present invention are possible in the light of the above teaching. It is therefore to be understood that without departing from the scope of the appended claims the invention may be practiced otherwise than as specifically described.

What is claimed is:

1. A frame joint structure for a vehicle comprising:

a first frame member of U-shaped cross section having a first sidewall, a second sidewall, a bottom wall and defining an opening one of said first and second sidewalls of the first frame member having a hole formed therein;

a second frame member being U-shaped in cross section and having a first sidewall, a second sidewall, and a bottom wall and defining an opening, said second frame member having an end portion connected to the one of the first and second sidewalls of the first frame member having the hole formed therein adjacent the hole such that the second frame member first sidewall is laterally spaced from the hole on one side of the hole, the second frame member second sidewall is laterally spaced from the hole on an opposite side of the hole, and the second frame member bottom wall is vertically spaced from a bottom side of the hole, so as to define a joint between the first and second frame members;

a reinforcing member received in both the first frame member and the second frame member, said reinforcing member extending through said joint and into said first frame member a first predetermined length so as to have a free end adjacent said joint and extending in said second frame member a second predetermined length so as to have another free end adjacent said joint;

a plate member closing the openings of the first and second frame members so as to form closed cross sections of the vehicle frame joint structure; and a foamed resin surrounding the reinforcement member and filling space defined by the plate member, the first and second frame members and the reinforcing member, such that the reinforcement member is spaced from the first and second frame members and the plate member by the foamed resin, and wherein the foamed resin results from foaming an unfoamed resin applied uniformly onto at least upper and lower surfaces of the reinforcing member, and wherein the foamed resin serves to space said reinforcing member from said first and second frame members and cooperates with said reinforcing member to strengthen said joint.

2. The joint structure according to claim 1, wherein the reinforcing member is generally T-shaped open-ended pipe, and wherein the unfoamed resin is applied only to the reinforcing member such that the subsequently foamed resin secures the reinforcing member to the first and second frame members and thereby reinforces the first and second frame members only in a vicinity of the joint.

3. The joint structure according to claim 1, wherein the reinforcing member is a generally L-shaped open ended pipe, and wherein the unfoamed resin is applied only to the reinforcing member such that the subsequently foamed resin secures the reinforcing member to the first and second frame members and thereby reinforces the first and second frame members only in a vicinity of the joint.

4. The joint structure according to claim 1, wherein the plate member, the first frame member, and the second frame member are made from a first metal material while the reinforcing member is made from a second metal material, said first metal material being different than said second metal material.

5. The frame joint structure according to claim 1, wherein the reinforcing member is formed as a solid plate, and wherein the unfoamed resin is applied only to the reinforcing member such that the subsequently foamed resin secures the reinforces the first and second frame members an thereby reinforces the first and second frame members only in a vicinity of the joint.

6. The frame joint structure according to claim 5, wherein the plate member and the first and second frame members are formed from a first metal material and are affixed to one another by welding.

7. The frame joint structure according to claim 6, wherein the reinforcing member is formed from a second metal material, and wherein the first metal material is different than the second metal material.

8. The frame joint structure according to claim 1, wherein said hole is larger than a cross-sectional dimension of said reinforcing member such that said reinforcing member may freely extend through the hole in the first frame member, and whereby an annular space surrounding said reinforcing member and said one of said first and second sidewalls of said first frame member at said hole being filled with said foamed resin.

9. The frame joint structure according to claim 8, wherein the plate member is generally planar, wherein the plate member and the first frame member are made of steel and the second frame member is made of an aluminum alloy, and wherein the plate member and the first and second frame members are affixed to one another by welding.

10. The frame joint structure according to claim 1, wherein the reinforcing member is an extruded open-ended tubular structure having a series of external grooves formed therein, said grooves serving to receive foamed resin to thereby connect said foamed resin to said reinforcing member, and wherein the unfoamed resin is applied only to the reinforcing member such that the subsequently foamed resin secures the reinforcing member to the first and second frame members and thereby reinforces the first and second frame members only in a vicinity of the joint.

11. The frame joint structure according to claim 10, wherein said reinforcing member is generally L-shaped.

12. A frame joint structure for a vehicle comprising:

a first frame member being U-shaped in cross section and having a first sidewall, a second sidewall, and a bottom wall and defining an opening, one of said first and second side walls of the first frame member has a hole formed therein;

a second frame member being U-shaped in cross section and having a first sidewall, a second sidewall, and a bottom wall and defining an opening, said second frame member having an end portion connected to the one of the first and second side walls of the first frame member so as to define a joint between the first and second frame members;

a reinforcing member received in both the first frame member and the second frame member, said reinforcing member extending through said joint and into said first frame member a first predetermined length so as to have a free end adjacent said joint and extending in said second frame member a second predetermined length so as to have another free end adjacent said joint;

a plate member closing the opening of the first and second frame members so as to form closed cross sections of the vehicle frame joint structure; and a foamed resin filing spaces defined by the plate member, the first and second frame members and the reinforcing member, wherein the foamed resin results from foaming an unfoamed resin applied uniformly onto at least upper and lower surfaces of the reinforcing member, and wherein the foamed resin serves to space said reinforcing member from said first and second frame members and cooperates with said reinforcing member to strengthen said joint, said second frame member having an end portion connected to one of the first and second sidewalls of the first frame member, and wherein said one of said first and second sidewalls of the first frame member has a hole formed therein wherein the second frame member first sidewall is laterally spaced from the hole on one side of the hole, the second frame member second sidewall is laterally spaced from the hole on an opposite side of the hole, and the second frame member bottom wall vertically spaced from a bottom side of the hole; and, wherein said hole is larger than a cross-sectional dimension of said reinforcing member such that said reinforcing member may freely extend through the hole in the first frame member, and whereby an annular space surrounding said reinforcing member and said one of said first and second sidewalls of said first frame member at said hole being filled with said foamed resin, wherein the plate member is generally planar.

13. The frame joint structure according to claim 12, wherein the reinforcing member is formed from a second metal material, and wherein first metal material is different than the second metal material.

14. The frame joint structure according to claim 12, wherein the plate member and the first and second frame members are formed from a first metal material and are affixed to one another by welding.

15. The frame joint structure according to claim 14, wherein the reinforcing member is formed from a second metal material, and wherein first metal material is different than the second metal material.

* * * * *